INVENTOR
MARVIN W. HARP
BY Henry H Snelling
ATTORNEY

April 26, 1960  M. W. HARP  2,934,157
TWO WHEELED TRACTOR
Filed Aug. 9, 1955  4 Sheets-Sheet 3

INVENTOR
MARVIN W. HARP
BY *Henry H. Snelling*
ATTORNEY

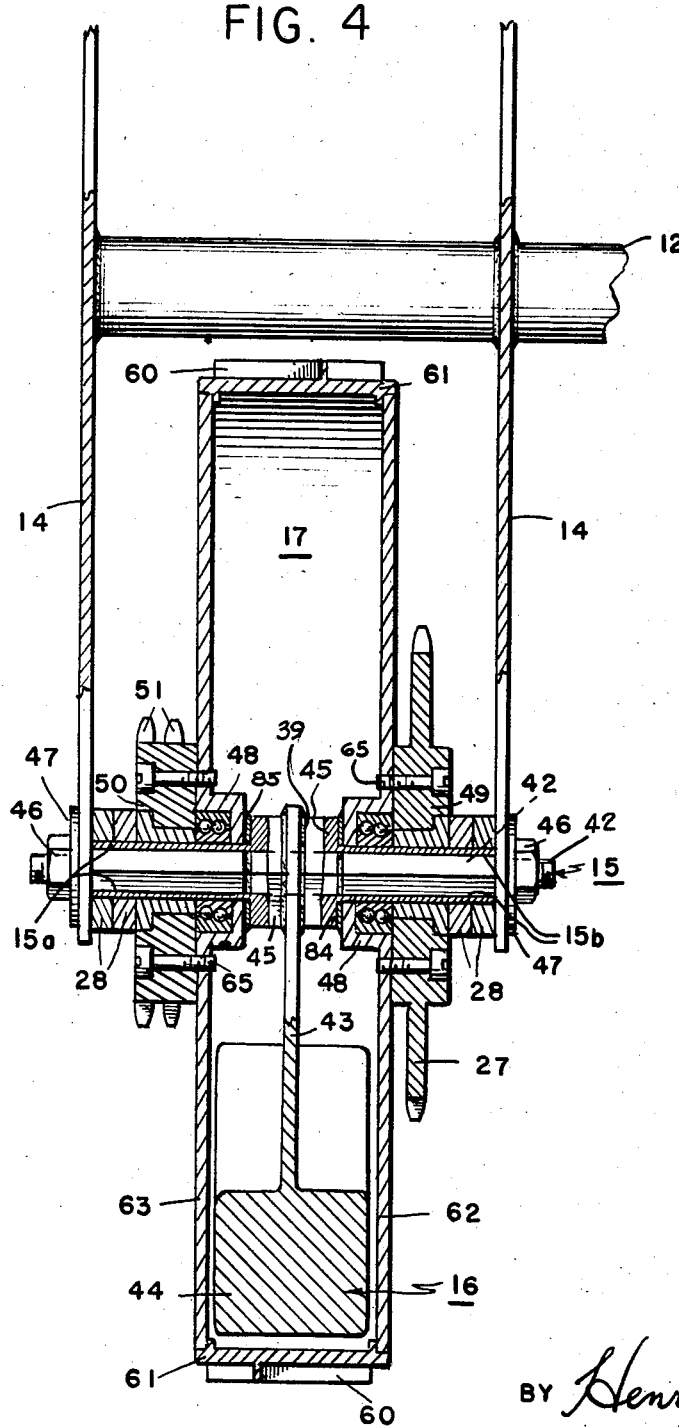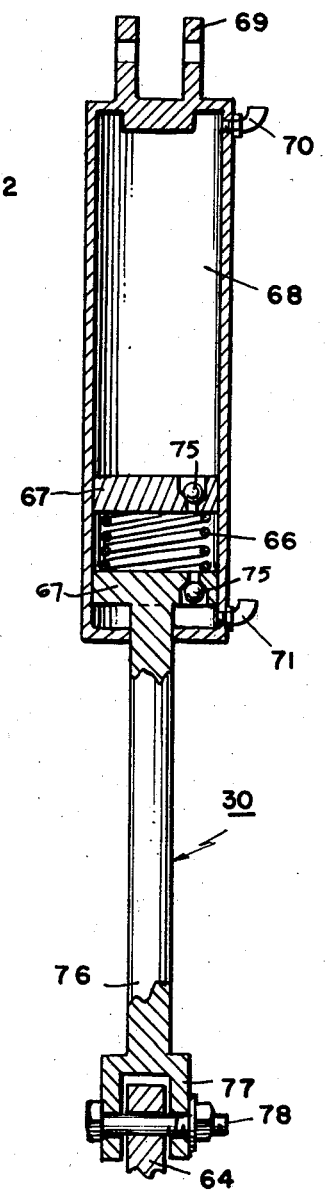

United States Patent Office 2,934,157
Patented Apr. 26, 1960

2,934,157
TWO WHEELED TRACTOR

Marvin W. Harp, Baton Rouge, La.

Application August 9, 1955, Serial No. 527,365

8 Claims. (Cl. 180—21)

This invention relates to tractors and has for its principal object the provision of a tractor in which the weight of the machine is carried by two coaxial wheels with the device in equilibrium when standing or when moving, the center of gravity of all parts collectively being directly below the axis of turning of the two ground engaging wheels.

A further object of the invention is to provide a secondary stabilizing mechanism including fore and aft tilt wheels which may be held in horizontal or any other desired position by a teeter bar carried by the main frame, but with freedom for the tilt wheels to yield independently of each other as when meeting minor obstructions when traveling on a level or when climbing or descending a grade.

A further object of the invention is to provide a tractor suitable for use with a bulldozer blade, a boom or many of the other devices with which a tractor may be associated, in which the center of gravity of the device is exceptionally low by reason of a counterweight suspended to oscillate about the axis of ground engaging wheels positioned coaxially at both sides of the device, and with the driving means located fairly low between the wheels.

A still further object of the invention is to provide a tractor having two coaxial main driving wheels designed to travel at a speed greater than track tractors when carrying the same load and having greater maneuverability than such an endless track machine.

In the drawings:

Figure 4 is a vertical section taken through the main driving axle.

Figure 5 is a vertical section through one of the rods which raise the main wheels out of contact with the ground.

Figure 6 is a vertical section through the main axle.

Figure 1:
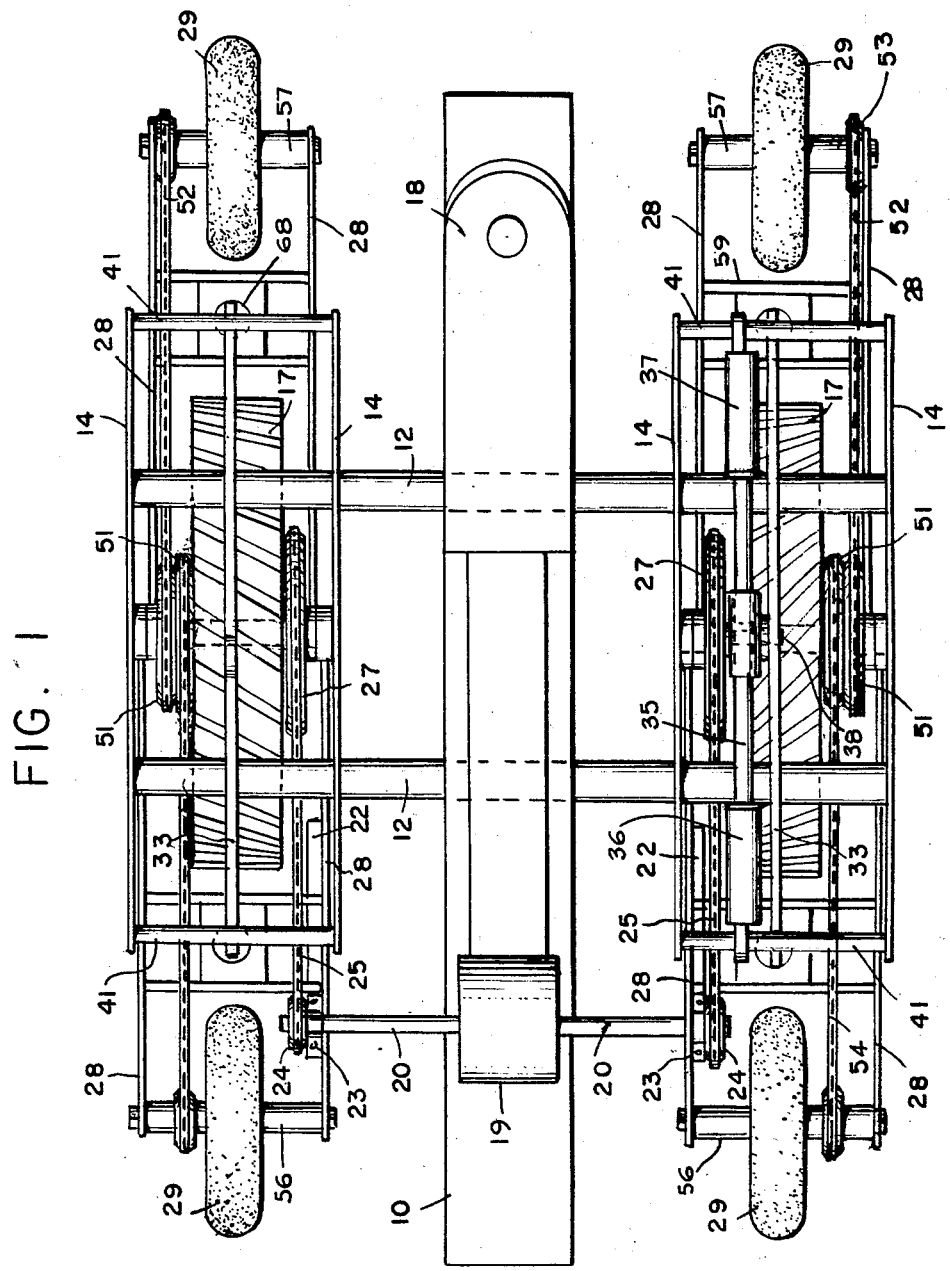
Figure 1 is a top plan view, certain parts of the left-hand driving unit being omitted.

The main tractor frame includes the base 10 on which the engine assembly is mounted, the cross members 12 by which the base is supported either above or below these members 12, four dart-shaped vertical plates 14 secured to the cross members, and the ground wheel axle 15 which may be, and preferably is, in two coaxial sections the inner member of each section being a bolt 42 of square cross section but threaded at both ends to receive nuts 46 so that each of the bolts are firmly secured to the bottom corners of the pairs of plates 14. The other section of the ground wheel axle includes two cylindrical sleeves integral with the counter weight 16. The wheel hub 48 and the sprockets 49 and 50 are rotatably supported by these sleeves, which also serve as pivots for the four eye-ends of rod 28. The frame and all of the elements which are rigidly connected to it are held in equilibrium by a counterweight 16, which itself always moves with the frame and is free to oscillate with attached plates 14 and axle 15 about the axis of the latter but always carrying the frame and the engine assembly with it as it swings, the counterweight having a weight varying up to four or more times the weight of the tractor, not including the two ground wheels 17 which turn upon the non-rotating axle 15 and support the weight of the vehicle.

As with the axle it is preferred that the counterweight shall be in two sections so there may be a large space between the wheels 17, and in the form shown, also below the engine base. The particular type of tractor illustrated in the drawings is designed for an awkward suspended load, such as logs, which may be carried between the wheels. The invention contemplates other quite different uses for the tractor.

The engine unit includes the usual members, such as the internal combustion engine, motor, or other power source 18, the driver's seat 19, transverse driving shafts 20, and operating levers 21 as well as the normal parts not illustrated but forming standard parts of a driving unit. An excellent example of the driving assembly is illustrated in Circular "OC-3," form No. "A-1009-B" published March 1953 by The Oliver Corporation of 400 West Madison Street, Chicago 6, Illinois, showing the well-known Oliver crawler tractor Model OC-3, power plant with transmission and final drive. Cantilevers 22 extend rearwardly from the two adjacent inside plates 14 of each of the two side units to support bearings 23 for the outer ends of shafts 20 which carry near these bearings sprocket wheels 24 by which thru chains 25 the ground wheels 17 are driven, each wheel having a fairly large gear 27, these tractors being relatively slow speed vehicles. As usual the ground wheels are driven independently of each other in order to steer the vehicle in well known manner, thus providing an extremely small turning radius, which with a nicely balanced load will approximate half the vehicle width.

Although the tractor may be operated with just the parts described, it is preferred to provide additional supporting means with auxiliary wheels, both in front of and in rear of the wheels 17, among other advantages obtained being the ability to move the vehicle from place to place with the cleated ground wheels 17, which are not suitable for travel on paved highways, out of vehicle supporting relation. For this purpose four pairs of auxiliary arms 28 are pivoted to turn about axes parallel to the main axle, each pair having at their free ends rubber tired tilt wheels 29. The pairs of arms are resiliently urged downward by composite rods 30 so that the auxiliary wheels 29 may touch the ground with any desired pressure and independently yield when meeting an obstruction.

Figure 2:
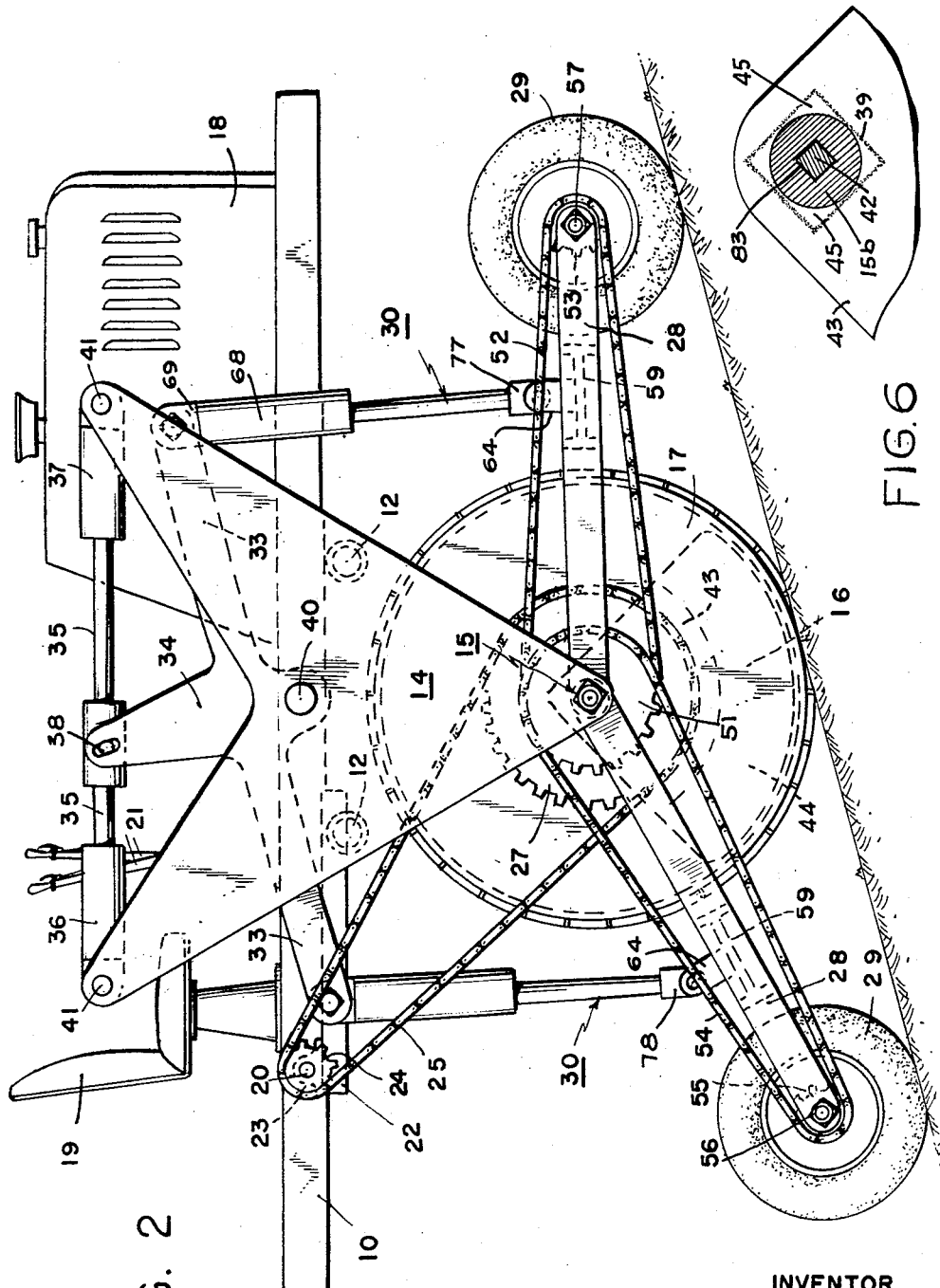
Figure 2 is a side elevation showing the device climbing a slope.
Figure 3:
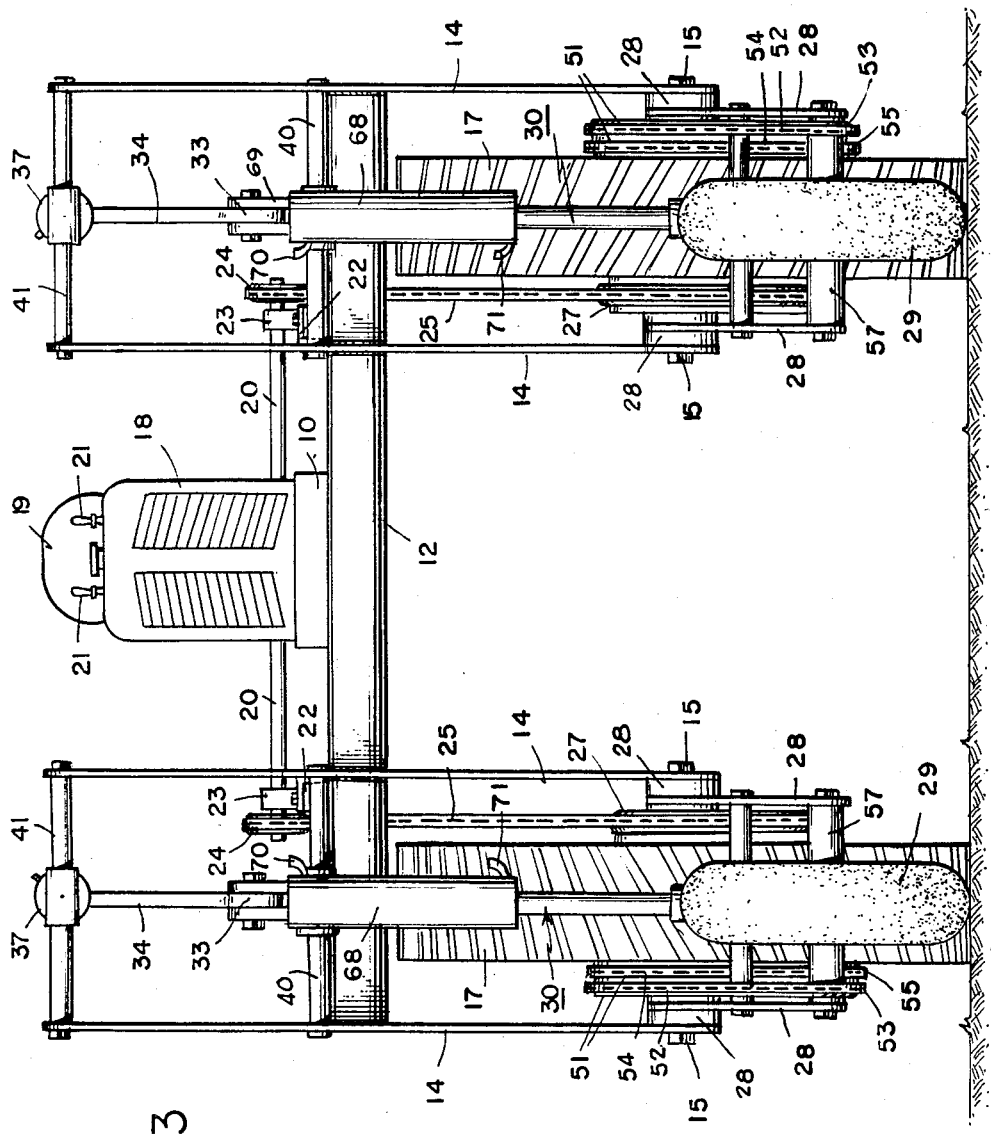
Figure 3 is a front elevation.

Because the engine supporting bed 10 is maintained in horizontal position by the counterweight 16, it is desirable to provide means whereby the angle of the front pair of arms 28 with respect to horizontal may be altered from a normal of perhaps 20° to zero or even less when climbing a grade for example, in which case the forward and the rear pair of arms will be at the same angle (but reversed) to the plane of the sloping ground. This is accomplished as shown in Figure 2 by connecting the upper ends of rods 30 to centrally pivoted teeters 33, the upstanding central stems or posts 34 of which are slotted to engage transverse trunnions 38 on horizontal plungers 35 operable in opposite directions by their hydraulic cylinders 36 and 37 controlled from the operator's seat 19 to move a teeter about its fulcrum shaft or pivot 40 extending between the pair of plates 14 of the side unit of the frame, so as to be directly above the main axle and parallel thereto. As will be noted in Figure 2 it is possible to rock the teeter bar back and forth with the cylinders 36 and 37 in order to make the auxiliary wheels 29 carry a greater or lesser portion of the load as may be desired. Up to certain limits it will be possible to hold the frame of the machine level, even though it is climbing a considerable incline. The hinge pins 41 to which the cylinders 36 and 37 are connected at their ends extend between the pair of plates 14 at their upper corners so that plunger rods 35 remain parallel to the elongated channel irons which usually form the side elements of the engine frame or base 10.

Referring particularly to Figure 4 the counterweight 16 is a 90° sector having a relatively thin center web 43 and a very heavy lower segment 44. The web is welded as to 39 to the square section central portion 45 of the outer member of the main axle 15, the latter having integral cylindrical ends 15a and 15b which extend to and are clamped to the inside surfaces of plates 14. The portion of the outer member of the axle 15 between the plates 14, has completely through it a square hole 83 to receive snugly the square section axle bolt 42 extending beyond the plates 14 on each side to carry a washer 47 and is threaded at each end to receive a retaining nut 46. This bolt 42 is a part of axle 15, its function being to clamp the major portion of the axle between the lower ends of the two parallel plates 14 so that all parts shown in Fig. 4, except the four arms 28 and the members rotating with wheel 17, are rigidly held together to move as a single unit about the axis of the wheels 17 with the counterweight 16 giving stability. By having the bolt 42 separate, the wheel-sprocket-axle-counterweight assembly plus the four arms can all readily be slipped between the plates at the same time and the bolt 42 then secured in place. The two bosses 48 of the main wheel 17 and the sprocket hubs 49 and 50 bolted to the wheel 17 as at 65 turn freely as a unit on the cylindrical ends 15a and 15b of the outer member of the main axle 15 between the shoulders 84 formed between the large square central section 45 and the proximate integral cylindrical end. The enlarged ring-like ends of the arms 28 which carry the auxiliary wheels 29 oscillate on the cylindrical ends 15a and 15b of axle 15. An optional washer 85 may be placed between the shoulder 84 and the hub 48. The smaller driving sprocket hub 50 carries two similar series of spaced driving sprocket teeth 51, one ring of teeth for the front chain 52 to sprocket 53 on shaft 57 and the other for chain 54 to driven sprocket 55 on the rear auxiliary wheel axle 56. The sizes of the sprockets may be such that the auxiliary wheels 29 travel at the same ground speed as the cleated wheels 17 but where the tractor is to travel at frequent intervals on paved roads larger sprockets 51 are furnished so that the rubber tired wheels may drive the tractor at a much greater travel speed when the steel wheels are elevated as later described.

It will be noted that the space within the wheel 17 in the path of the counter weight is entirely free. The steel wheels 17 carry cleats 60 on their cylindrical peripheries 61. The outer of the inner walls, 62 and 63 respectively, or both, are removable from the tread 61, but the joints are such that the wheels are sealed against the entry of water even when both wheels 17 are deep in mud.

The arms 28 of each pair of joined by I-beams 59, having small central lugs 64 to which the lower ends of rods 30 are pivoted (see Fig. 5). A helical spring 66 is positioned between the piston heads 67. Cylinder 68 which forms the upper end of rod 30 is pivoted by lugs 69 to the teeter 33. By admitting hydraulic fluid as at 70 to the upper end of all four cylinders 68 the eight arms 28 are simultaneously moved, this action lowering the four auxiliary rubber tired wheels 29 to such an extent as to elevate wheels 17 above the ground level whereby the tractor is supported solely by the four wheels 29 permitting the tractor to travel readily on a paved road. Altho the radius of turning of the tractor when supported by the auxiliary wheels is naturally greatly increased, the maneuverability when the device is propelled by these small wheels is easily sufficient to permit negotiating the sharpest curves which may be expected in a normal highway. When the tractor is being operated as a straddle lift, and where there is anything like fair terrain the auxiliary wheels 29 will be lifted just clear of the ground by the introduction of oil under pressure in the lower portion of the cylinders as at 71. This pressure will not be very great as there will only be required enough pressure to lift the weight of one wheel assembly and its frame, per cylinder. At this time the upper portion of cylinder 68 will be open through the operating valve back to the oil reservoir (not shown), permitting spring 66 to function as a shock absorber when one of the auxiliary wheels 29 strikes a rise in the ground or the main wheel 17 falls into a depression. Under these conditions the hydraulic cylinders 68 will be holding the teeter bar in a position parallel to the longitudinal frame members, with the four wheels 28 at the same level.

The piston heads 67 are urged apart by the helical springs 66 which when compressed carry the total weight of the tractor. Oil is prevented from being trapped between the heads by one-way valves 75, thus permitting the springs to function in all positions.

The upper piston head 67 is relatively free, having on one side the oil admitted through 70 and on the other side the spring 66 but the lower piston head 67 is fast to connecting member 76 having at its bottom the clevis 77 carrying a pin 78 for attachment to the lug 64 on the transverse bar 59 joining arms 28. The four dart shaped members 14, the two cross members 12 which pass through all four of the dart shaped members and are welded to them, the longitudinal members 10 on which the engine and the drive assembly are mounted, the parts of the main axle 15, and the counterweights 16 are all a rigidly assembled unit, and any movement of the one must cause in turn a relative movement of all the rest.

What I claim is:

1. In a tractor, a frame, a non-rotatable main axle fast thereto, a driving assembly comprising a centrally positioned motor and power transmission mechanism including oppositely directed driving shafts secured to said frame, a pair of spaced ground wheels rotatable about said axle, counter-balancing means secured to the frame for holding the driving assembly elevated above the axis of the wheels, means operatively connecting each of the spaced ground wheels to one of the driving shafts to propel the tractor, arms pivotally carried by the frame, tilt wheels at the free ends of the arms, resilient means connecting the arms to the frame to permit either tilt wheel to yield when meeting an obstacle and a teeter centrally pivoted to the frame and connected to the upper ends of the resilient means.

2. The device of claim 1 in which the teeter is T-shaped with a stem extending radially from the teeter pivot on the frame and power means is carried by the frame for moving the stem about the pivot of the teeter.

3. In combination, a tractor frame including a pair of depending supporting members and an axle fixedly secured between the supporting members and serving to brace same, a counter weight secured to the axle approximately centrally, said axle having an integral cylindrical sleeve on each side of the counter weight and extending to the proximate suporting member, and a hollow cylindrical tractor supporting wheel rotatable on both sleeves and completely enclosing the counter weight, a drive gear rotatably mounted on one sleeve, a driven gear rotatably mounted on the other sleeve, and the tractor supporting wheel is fast to both gears.

4. The device of claim 3 in which both gears are sprocket wheels, the driven gear carrying a plurality of spaced series of teeth.

5. In a tractor, two spaced driving units each comprising a unit frame, a main driving wheel mounted centrally in the unit frame, two pairs of arms pivoted to the unit frame on opposite sides of the central wheel, an axle carried by the free ends of each pair of arms, an auxiliary wheel mounted on each of said axles, a T-shaped teeter lever centrally pivoted to the unit frame immediately above the axis of the central wheel and operatively connected at each end to one of the pair of arms, a reciprocating plunger centrally pivoted to the central arm of each T-shaped teeter lever, cylinders at each end of the plunger and secured to the unit frame, drive means connecting the main and auxiliary wheels, and a counterweight secured to the unit frame and swinging with it about the axis of the main wheel; a plurality of transverse members joining the two units, a platform carried by the transverse members, power means on the platform including independently operative drive shafts, one for each unit, and drive means connecting each drive shaft to the corresponding central wheel to thereby drive the central and auxiliary wheels of the corresponding unit.

6. The tractor of claim 5 in which the pairs of arms are connected to the teeter by resilient mechanism.

7. The tractor of claim 6 in which the resilient means includes a cylinder pivoted to the teeter headed pitman sliding within the cylinder, and a coiled spring within the cylinder engaging the pitman head.

8. A tractor driving assembly carried by a frame and including oppositely directed final drive shafts, a pair of coaxial ground wheels supporting the frame approximately centrally from front to back, a tilt wheel forwardly of the ground wheels, a tilt wheel rearwardly of the ground wheels, driving means for connecting the final drive shafts with the ground wheels and with both of the tilt wheels for driving said wheels, means for holding the tilt wheels below the ground wheels to support the entire weight of the tractor, each of the tilt wheels being pivoted in arms movable about the axis of the ground wheels, and power means for moving the arms away from the frame so as to force the tilt wheels against the ground with any desired pressure, the power means including two hydraulic cylinders, each cylinder containing two spaced pistons with a spring urging the pistons apart, whereby either tilt wheel may yield when meeting an obstruction.

References Cited in the file of this patent

UNITED STATES PATENTS

| | | |
|---|---|---|
| 26,466 | Bailey | Dec. 20, 1859 |
| 1,240,678 | Cornell | Sept. 18, 1917 |
| 1,357,571 | Knepper | Nov. 2, 1920 |
| 1,754,431 | Kraeft | Apr. 15, 1930 |
| 2,037,741 | Sauzedde | Apr. 21, 1936 |
| 2,125,195 | Palen | July 26, 1938 |
| 2,184,198 | Seeber | Dec. 19, 1939 |
| 2,224,411 | Smith | Dec. 10, 1940 |
| 2,307,096 | Zink et al. | Jan. 5, 1943 |
| 2,372,043 | Aghnides | Mar. 20, 1945 |
| 2,426,342 | Couse | Aug. 26, 1947 |
| 2,549,182 | Ekenstam | Apr. 17, 1951 |
| 2,611,443 | Paramythioti | Sept. 23, 1952 |
| 2,722,280 | Ballu | Nov. 1, 1955 |

FOREIGN PATENTS

| | | |
|---|---|---|
| 254,983 | Italy | Oct. 1, 1927 |